US012570186B2

(12) United States Patent (10) Patent No.: US 12,570,186 B2
Reinhardt et al. (45) Date of Patent: Mar. 10, 2026

(54) VEHICLE SEAT

(71) Applicant: BROSE FAHRZEUGTEILE SE & CO. KOMMANDITGESELLSCHAFT, COBURG, Coburg (DE)

(72) Inventors: Daniel Reinhardt, Coburg (DE); Waldemar Schröder, Ahorn (DE)

(73) Assignee: BROSE FAHRZEUGTEILE SE & CO. KOMMANDITGESELLSCHAFT, COBURG, Coburg (DE)

( * ) Notice: Subject to any disclaimer, the term of this patent is extended or adjusted under 35 U.S.C. 154(b) by 202 days.

(21) Appl. No.: 18/261,081

(22) PCT Filed: Jan. 14, 2022

(86) PCT No.: PCT/EP2022/050733
§ 371 (c)(1),
(2) Date: Jul. 11, 2023

(87) PCT Pub. No.: WO2022/157079
PCT Pub. Date: Jul. 28, 2022

(65) Prior Publication Data
US 2024/0059194 A1 Feb. 22, 2024

(30) Foreign Application Priority Data

Jan. 20, 2021 (DE) ..................... 10 2021 200 498.9

(51) Int. Cl.
B60N 2/06 (2006.01)
B60N 2/08 (2006.01)
(52) U.S. Cl.
CPC ............. B60N 2/0881 (2013.01); B60N 2/06 (2013.01)

(58) Field of Classification Search
CPC ......... B60N 2/976; B60N 2/06; B60N 2/0881
See application file for complete search history.

(56) References Cited

U.S. PATENT DOCUMENTS

| 4,190,226 A | 2/1980 | Letournoux et al. |
| 6,637,712 B1 | 10/2003 | Lagerweji |
| (Continued) | | |

FOREIGN PATENT DOCUMENTS

| CN | 101326077 A | 12/2008 | |
| CN | 113682208 A | * 11/2021 | ........... B60N 2/0881 |
| (Continued) | | | |

OTHER PUBLICATIONS

ISA European Patent Office, International Search Report Issued in Application No. PCT/EP2022/050733, May 3, 2022, WIPO, 4 pages.

(Continued)

*Primary Examiner* — Timothy J Brindley
(74) *Attorney, Agent, or Firm* — McCoy Russell LLP

(57) ABSTRACT

It is provided a vehicle seat having a longitudinal adjustment assembly for adjusting the vehicle seat along a longitudinal axis, wherein the longitudinal adjustment assembly comprises a locking device for locking the vehicle seat in a seat longitudinal position along the longitudinal axis, a pivotable actuation element having an actuation portion and a coupling portion, wherein an adjustment force for actuating the locking device can be introduced into the actuation element via the actuation portion and the coupling portion is provided for transmitting the adjustment force to the locking device, and a supporting element for supporting the actuation element during a pivoting movement of the actuation element, which pivoting movement is to be carried out for the transmission of the adjustment force to the locking device. The supporting element is formed by a separate (Continued)

component mounted on a structural element of the vehicle seat.

19 Claims, 3 Drawing Sheets

(56) References Cited

U.S. PATENT DOCUMENTS

| | | | | | |
|---|---|---|---|---|---|
| 8,408,511 | B2 * | 4/2013 | Semenchenko | .......... | B60N 2/06 |
| | | | | | 297/344.11 |
| 8,967,580 | B2 * | 3/2015 | Beneker | ............... | B60N 2/1615 |
| | | | | | 297/344.1 |
| 11,124,091 | B2 * | 9/2021 | Aktas | ................... | B60N 2/0806 |
| 11,642,988 | B2 * | 5/2023 | Susko | ................... | B60N 2/0881 |
| | | | | | 248/429 |
| 2008/0277986 | A1 | 11/2008 | Herringshaw et al. | | |
| 2009/0178508 | A1 | 7/2009 | Kanda | | |
| 2014/0348574 | A1 | 11/2014 | Jähner et al. | | |

FOREIGN PATENT DOCUMENTS

| | | | | | |
|---|---|---|---|---|---|
| CN | 115476740 | A | * | 12/2022 | ............ B60N 2/073 |
| DE | 2843254 | A1 | | 4/1979 | |
| DE | 102009017354 | A1 | | 10/2010 | |
| DE | 102010042888 | A1 | | 4/2012 | |
| DE | 102013218868 | A1 | | 3/2015 | |
| DE | 102012006060 | B4 | | 8/2019 | |
| EP | 0947382 | A2 | | 10/1999 | |
| EP | 3733445 | A1 | * | 11/2020 | .......... B60N 2/0705 |
| FR | 3009245 | A1 | | 2/2015 | |
| JP | 2012136138 | A | | 7/2012 | |

OTHER PUBLICATIONS

China National Intellectual Property Administration, Office Action and Search Report Issued in Application No. 202280009111.1, Jan. 12, 2026, 12 pages. (Submitted with Partial Translation).

* cited by examiner

VEHICLE SEAT

BACKGROUND

The proposed solution relates to a vehicle seat.

A vehicle seat of this kind comprises at least one longitudinal adjustment assembly for adjusting the vehicle seat along a longitudinal axis, wherein the longitudinal adjustment assembly comprises a locking device for locking the vehicle seat in a seat longitudinal position along the longitudinal axis. The vehicle seat further comprises a pivotable actuation element which comprises an actuation portion and a coupling portion, wherein an adjustment force for actuating the locking device can be introduced into the actuation element via the actuation portion and the coupling portion is provided for transmitting the adjustment force to the locking device. Furthermore, the vehicle seat comprises a supporting element for supporting the actuation element during a pivoting movement of the actuation element, which pivoting movement is to be carried out for the transmission of the adjustment force to the locking device.

According thereto, such vehicle seats are designed to be adjusted and locked by a vehicle seat user with respect to the seat longitudinal position along the longitudinal axis. In this case, the seat longitudinal position can be set for example to a preferred position of the vehicle seat user or another advantageous arrangement of the vehicle seat. Typically, the longitudinal adjustment assembly of the vehicle seat is connected to a vehicle floor by means of a rail guide. Thus, the actuation element is also arranged at least having its coupling portion close to the rail and under a seat surface. Since the supporting element supports the actuation element during the pivoting movement that is to be carried out for the transmission of the adjustment force to the locking device, accordingly the supporting element is generally also arranged close to the rail and under the seat surface.

Supporting elements such as torsion bar springs or stem assemblies are known in principle. These solutions are often heavy, space-consuming and complex to assemble, owing to the use of metal materials and metal connection means such as screws.

However, on account of the arrangement of the supporting element under the seat surface, the installation space for the supporting element is essentially limited. This can make it more difficult to assemble the space-consuming supporting elements and to assemble supporting elements having complex connections to the actuation element.

Accordingly, in particular torsion bar springs are generally difficult to assemble, since this takes place in the restricted installation space of final assembly, and they typically have to be wound around the actuation element. Furthermore, in a variant comprising torsion bar springs, the actuation element is generally very long, which results in further disadvantages with respect to elasticity, weight and costs. Sub-assemblies are, moreover, expensive, since additional connection elements such as screws are required, and the cycle times during the final assembly are increased by additional modules.

SUMMARY

Against this background, there is a need to improve such vehicle seats with respect to the supporting elements used.

Against this background, a vehicle seat having features as described herein is proposed.

According thereto, the supporting element of the proposed solution is formed by a separate component mounted on a structural element of the vehicle seat, by means of which component the actuation element can be supported at a support portion of the actuation element during the pivoting movement for the transmission of the adjustment force, which support portion is arranged between the coupling portion and the actuation portion with respect to the longitudinal axis.

In the case of assembly of the vehicle seat of the proposed solution, the separate supporting element can be connected to the structural element in such a way that the actuation element is supported on the supporting element during the pivoting movement. Assembly of this kind can in particular also be possible in a limited installation space. Furthermore, pre-assembly of a module is also conceivable in principle, which module comprises the supporting element and/or the structural element and/or the actuation element. The pre-assembly makes it possible for an installation pace required for final assembly of the vehicle seat to be reduced, or for the final assembly in limited installation space to be facilitated.

In an embodiment of the proposed solution, the actuation element can be pivoted along an adjustment path between a locking position and an unlocking position by introducing the adjustment force into the actuation portion. By way of example, the adjustment path can be in the shape of a circular arc, wherein the actuation element carries out purely a rotational movement. Alternatively, an adjustment movement of the actuation element can also include translational components. Such translational components comprise directions within a plane in parallel with an extension plane of a rail guide of the longitudinal adjustment assembly. Depending on the embodiment of the locking device, however, purely a rotational movement of the actuation element for actuating the locking device may be advantageous. However, such translational components can, as set out in the following, be compensated by the supporting element of the proposed solution.

In one embodiment, the actuation element can, in the locking position, lock the locking device. Accordingly, a seat longitudinal position of the vehicle seat may be non-adjustable, as long as the actuation element is in the locking position. In contrast, the actuation element can, in the unlocking position, unlock the locking device. Accordingly, the seat longitudinal position of the vehicle seat may be adjustable, as long as the actuation element is in the unlocking position. In this case, the actuation element can be supported via the support portion during the pivoting movement between the locking position and the unlocking position, or vice versa, for transferring the adjustment force to the supporting element.

In a variant, the supporting element of the proposed vehicle seat comprises a connection part for connection of the supporting element to the actuation element.

In one embodiment of the proposed solution, the support portion can extend along the extension axis of the connection part, through the connection part. The supporting element can provide access for establishing a form-fitting connection between the supporting element and the actuation element. A form-fitting connection between the supporting element and the actuation element makes it possible for the actuation element of the proposed vehicle seat to be connected to the supporting element, in particular without the use of connection means. Use of complex assembly methods, such as screwing or riveting or the like, can thus be reduced. Against the background of the typically limited installation space, this can reduce the assembly effort and the assembly time. Furthermore, the weight of the proposed vehicle seat can be reduced compared with the prior art.

In an embodiment by way of example, the actuation element can extend without curvature along the extension axis of the connection part, in particular in the region of the support portion.

In an alternative or supplementary embodiment, the connection part can comprise at least one connection portion which encompasses the support portion at least in part. In particular, the supporting element can encompass the support portion in an orthogonal plane with respect to the extension axis of the connection part. In principle, the encompassing design of the connection part is not limited to the use in combination with the non-curved variant of the support portion.

The connection part encompassing the support portion makes it possible, in addition to the intended support of the actuation element during pivoting of the actuation element, to also secure the actuation element against misused forces. In particular, misused forces can be all forces which include translational force components. Within this meaning, translational force components are those which have directions of action within a plane in parallel with the extension plane of the rail guide. Such misused forces can also be directed orthogonally with respect to the adjustment path of the actuation element. Without compensation such misused forces can lead to an adjustment path that is different from that intended. This may sometimes lead to damage to the locking device and thus a malfunction of the longitudinal adjustment assembly. By way of example, such forces can in particular occur in the case of incorrect operation of the actuation element by a vehicle seat user.

Securing the actuation element against such misused forces also makes it possible to prevent the connection of the actuation element to the supporting element being separated. It is thus in particular possible to prevent impairment of the functionality of the vehicle seat with respect to its longitudinal adjustability. This increases the user-friendliness and can reduce repair effort for the proposed vehicle seat.

In a further embodiment of the proposed solution, at least one connection portion, provided on the supporting element, can comprise a lateral opening for insertion of the support portion of the actuation element during assembly of the vehicle seat. As a result, the support portion and the at least one connection portion can be brought into engagement without complex assembly steps. Thus, the assembly time and costs for fastening means can be further reduced.

In one embodiment of the proposed solution, the connection part can comprise two connection portions that are spaced apart along an extension axis of the connection part. In this case, the connection portions may be curved. In particular, the connection portions may be curved in a plane orthogonal to the extension axis of the connection part. Furthermore, the first and second connection portion can be arranged on the supporting element in such a way that one of the two connection portions rests on the support portion in the locking position of the actuation element, and the other of the two connection portions rests on said support portion in the unlocking position of the actuation element. Accordingly, the actuation element can be supported on one of the connection portions, respectively, during the pivoting.

The number of connection portions encompassing the coupling portion is in principle not limited. Thus, alternative embodiments of the proposed solution can also comprise supporting elements having three or more connection portions.

Furthermore, each of the connection portions can comprise one opening, respectively. It can thus be possible for the support portion of the actuation element to be brought into engagement with all the connection portions, by means of one insertion movement.

In one embodiment of the proposed solution, the connection part comprises exactly two connection portions, each having one opening. Furthermore, the openings of the two connection portions can also be arranged on opposite sides of the supporting element. The oppositely arranged openings of the connection portions make it possible for the actuation element to be fixed with respect to undesired movement. Thus, the fixing of the actuation element, in particular against misused forces, can be improved.

Inter alia in order to establish a non-destructively releasable connection of the supporting element to the actuation element, in a further embodiment of the proposed vehicle seat the connection part can be resilient, at least in portions. Accordingly, the at least one connection portion can be deflectable transversely to the extension axis of the connection part. The opening of the at least one connection portion can be smaller, in a neutral position, than a diameter of the actuation element in the region of the support portion. If, in the context of the assembly, the actuation element is inserted into the opening, then the actuation element and the at least one connection portion firstly come into contact. Applying a force directed in the insertion direction then makes it possible for the at least one connection portion to be deflected into an opening position. In this case, in the opening position the opening can be as large as or larger than the diameter of the actuation element in the region of the support portion. Thus, the actuation element can be inserted into the at least one connection portion. Furthermore, the connection part can be formed in such a way that the opening returns to a neutral position, in the case of the fully inserted actuation element, and encompasses the actuation element, at least in portions, in the region of the support portion.

In a further embodiment of the proposed vehicle seat, the actuation element can be pivotable about a pivot axis extending transversely with respect to the longitudinal axis, for actuating the adjustment device.

Furthermore, in a further embodiment of the proposed solution the pivot axis can extend through the supporting element. In particular, the pivot axis can extend through the connection part of the supporting element.

In a further embodiment of the proposed solution, the supporting element can be designed to transfer the pivoting movement of the actuation portion along a first pivot direction for actuating the locking device along a second pivot direction of the coupling portion counter to the first pivot direction. The locking device can lock or release the vehicle seat, depending on the pivot direction, by pivoting the coupling portion that is operatively connected to the locking device.

In a further embodiment of the supporting element comprising two connection portions, the pivot axis can extend between the two connection portions, with respect to the longitudinal axis. Each connection portion can define a receiving opening through which the support portion extends. Furthermore, the connection portions can each exhibit clearance in the direction of the adjustment movement of the actuation element. A diameter of the receiving opening can be larger, by the clearance, than the diameter of the actuation element in the region of the support portion. In one embodiment, the actuation element can be pivotable about the pivot axis extending between the connection portions. In some circumstances, a pivot range of the actuation element can be dimensioned by the clearance of the connection portions. The pivot range can be defined by the number of all the positions of the actuation element that can be achieved by the pivoting. The pivot range in particular has a first and second contact position, in which in each case further pivoting of the actuation element in one of the two pivot directions is not possible, since the actuation element rests at least on one of the connection portions in the region of the support portion. The design of the clearance makes it possible for the pivot range to be designed such that in each case one of the contact positions matches the locking position and the unlocking position. As a result, in some circumstances incorrect pivoting of the actuation element beyond the locking position or the unlocking position can be prevented.

In an alternative or supplementary embodiment of the proposed solution, the supporting element can comprise a fastening part for fastening to the structural element.

In a further embodiment, the fastening part can define a further extension axis that is orthogonal to the extension axis of the connection part.

In an alternative or supplementary embodiment, the structural element can, by way of example, extend through the fastening part, in the direction of the further extension axis, for fastening the supporting element on the structural element. In order to enable a form-fitting connection to be established between the structural element and the supporting element, the supporting element can provide access in the region of the fastening part. A form-fitting connection between the supporting element and the structural element makes it possible for the structural element of the proposed vehicle seat to be connected to the supporting element, in particular without the use of connection means. The use of complex assembly methods, such as screwing, riveting or the like, can under some circumstances be reduced. Against the background of the typically limited installation space, this can reduce the assembly effort and thus the assembly time. Furthermore, the weight of the proposed vehicle seat can be reduced compared with the prior art.

In an alternative or supplementary embodiment, the fastening part can encompass the structural element at least in part. In particular, the fastening part can encompass the structural element in a plane that is orthogonal with respect to the further extension axis. The fastening part encompassing the structural element makes it possible for the supporting element to be secured. Unintentional separation of the connection between the structural element and the supporting element can thus be prevented under some circumstances. It is thus in particular possible to prevent impairment of the functionality of the vehicle seat with respect to its longitudinal adjustability. This increases the user-friendliness and can reduce necessary repairs to the proposed vehicle seat.

In particular, the supporting element can be clipped to the structural element via the fastening part. Accordingly, the supporting element is plugged onto the structural element with automatic form-fitting latching on the structural element.

According to an alternative or supplementary embodiment of the proposed solution, the structural element can in principle be arranged on the vehicle seat having a longitudinal extension axis of the structural element orthogonal to the longitudinal axis. A structural element of this kind can connect two transverse sides of the vehicle seat or the longitudinal adjustment assembly, for reinforcing the vehicle seat. By way of example, the structural element can be formed by a transverse pipe.

Furthermore, in principle, in order to secure a predetermined position of the supporting element on the structural element, a securing element can be arranged on the structural element. This can in particular be designed to axially secure the supporting element with respect to the longitudinal extension axis of the structural element.

Accordingly, in an embodiment by way of example the at least one securing element can be designed having a support bracket that encompasses the supporting element and the structural element at least in part. Alternative or additionally, the at least one securing element can be connected to the structural element in a form-fitting manner. For this purpose, the structural element can comprise a groove, into which the securing element engages. In principle, the groove can be formed transversely to the longitudinal extension axis of the structural element. Furthermore, the groove can be designed so as to be peripheral, irrespective of the orientation of the groove. The securing element that is connected to the groove in a form-fitting manner can protrude radially out of the groove, with respect to the longitudinal extension axis of the structural element. For axially securing the supporting element, a protruding part of the securing element can define a projection.

In principle, the securing element can also be connected to, in particular formed in one piece with, the fastening part.

Inter alia in order to establish a non-destructively releasable connection of the supporting element to the structural element, in a further embodiment of the proposed vehicle seat the fastening part can be resilient, at least in portions. Accordingly, the fastening part can be deflectable transversely to the further extension axis of the fastening part. As a result, an opening of the fastening part can, in a neutral position, be smaller than the diameter of the structural element in a region for connection as intended to the fastening part. If, in the context of the assembly, the structural element is inserted into the opening of the fastening part, then the structural element and the fastening part firstly come into contact. Applying a force directed in a further insertion direction then makes it possible for the fastening part to be deflected into an opening position. In this case, in the opening position the opening can be as large as or larger than the diameter of the structural element in a region for connection as intended to the fastening part. Thus, the structural element can be inserted into the fastening part. Furthermore, the fastening part can be formed in such a way that the opening returns to the neutral position, when the structural element is fully inserted, and thus encompasses the structural element at least in part.

In an alternative embodiment, the structural element and the supporting element can be interconnected in a non-releasable manner. In particular, the structural element and the supporting element can be formed in one piece.

In principle, the actuation element can be a towel bar.

Furthermore, the adjustment force can in principle also be introduced into the actuation element in a manner actuated by external force.

In order to reduce the weight and the material costs, the supporting element can furthermore consist of at least one plastics material. In order to further reduce costs, the supporting element can be produced in an injection-molding method.

Furthermore, the proposed solution also includes a vehicle comprising a vehicle seat according to one of the mentioned embodiments.

In this case, the embodiments described above for the vehicle seat also apply analogously for a proposed vehicle.

BRIEF DESCRIPTION OF THE DRAWINGS

The accompanying drawings illustrate, by way of example, possible embodiments of the proposed solution.

DETAILED DESCRIPTION

Figure 1B:
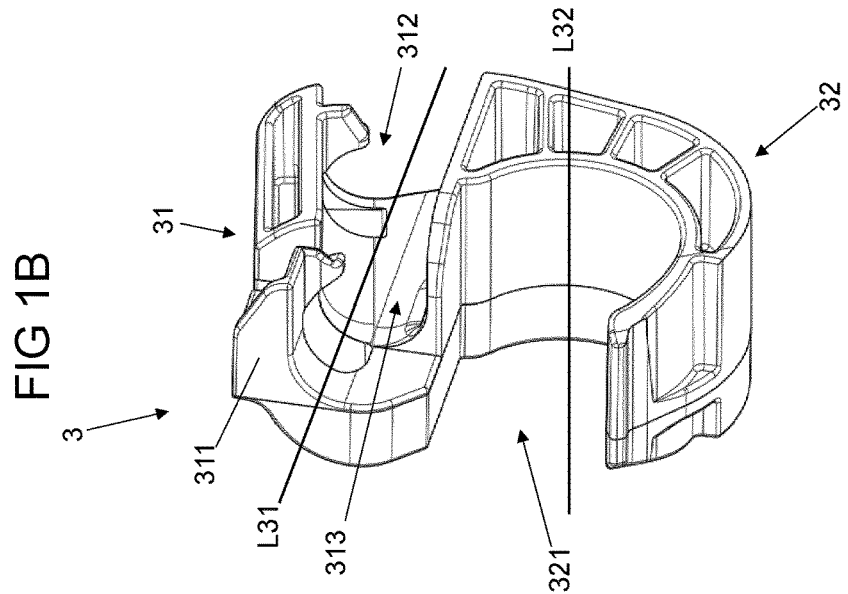
FIG. 1B is a perspective view of the supporting element in the variant shown in FIG. 1A, comprising a connection portion.
Figure 1A:
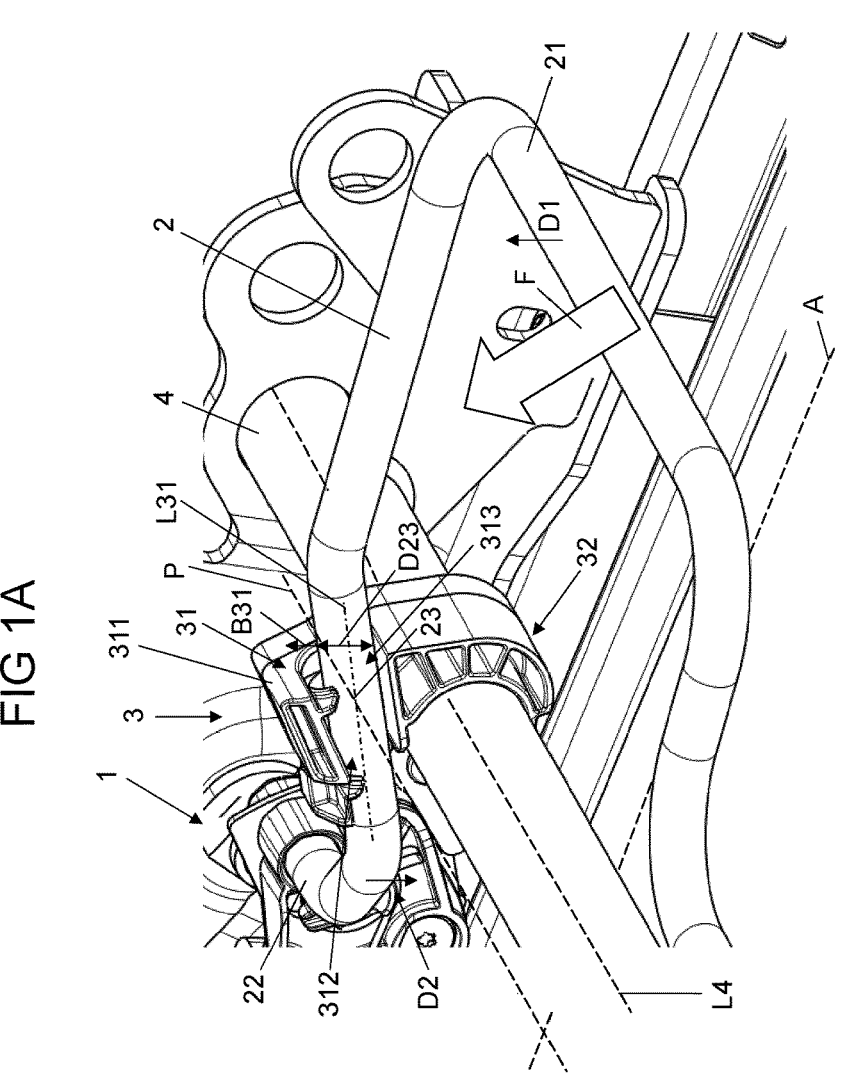
FIG. 1A is a perspective partial view of a vehicle seat of a first embodiment comprising a locking device, an actuation element, a supporting element and a structural element.

FIG. 1A is a perspective view of a part of a substructure of a vehicle seat according to the proposed solution. A vehicle seat of this kind comprises, inter alia, a longitudinal adjustment assembly for adjusting the vehicle seat along a longitudinal axis A, wherein the longitudinal adjustment assembly comprises a locking device 1 for locking the vehicle seat in a seat longitudinal position along the longitudinal axis A. Furthermore, the vehicle seat comprises a pivotable actuation element 2 which comprises an actuation portion 21 and a coupling portion 22, wherein an adjustment force F for actuating the locking device 1 can be introduced into the actuation element 2 via the actuation portion 21 and the coupling portion 22 is provided for transmitting the adjustment force F to the locking device 1. Furthermore, the vehicle seat comprises a supporting element 3 for supporting the actuation element 2 during a pivoting movement of the actuation element 3, which pivoting movement is to be carried out for the transmission of the adjustment force F to the locking device 1. In this case, the supporting element 3 is formed by a separate component mounted on a structural element 4 of the vehicle seat, by means of which component the actuation element 2 can be supported at a support portion 23 of the actuation element 2 during the pivoting movement for the transmission of the adjustment force F, which support portion is arranged between the coupling portion 22 and the actuation portion 21 with respect to the longitudinal axis A.

Furthermore, the supporting element 3 is designed as a separate component and is arranged on the structural element 4 of the vehicle seat without further connection means, such as screws or rivets. In the present case, the supporting element 3 is clipped onto the structural element 4, which is formed here by a transverse pipe extending between two seat longitudinal sides. The supporting element 3 is consequently plugged onto the structural element 4 with automatic form-fitting latching on the structural element 4.

In the embodiment of the proposed solution shown in FIG. 1A, the supporting element 3 comprises a connection part 31 having an extension axis L31. The connection part 31 furthermore comprises a connection portion 311 which encompasses the support portion 23 in part. The connection portion 311 encompasses the support portion 23 in an orthogonal plane with respect to the extension axis L31 of the connection part 31. Furthermore, the connection part 31 defines a receiving opening 313 through which the actuation element 2 extends with the support portion 23. The receiving opening 313 is larger, by a clearance B31, than a diameter D23 of the actuation element 2 in the region of the support portion 23. The actuation element 2 is thus arranged pivotably in the connection part 31. In particular, the actuation element 2 is pivotable about the pivot axis P, which extends through the connection part 31 of the portion element 3. In this case, the actuation element 2 can be pivoted along an adjustment path from the locking position, which is shown, into an unlocking position by introducing the adjustment force F into the actuation portion 21. In contrast, in the locking position shown, further pivoting of the actuation element 2 by applying a force counter to the adjustment force F, which is shown, is not possible on account of the shaping of the connection portion 311.

By way of example, the adjustment path can be in the shape of a circular arc, wherein the actuation element 2 carries out purely a rotational movement. Alternatively, an adjustment movement of the actuation element 2 can also comprise translational components, which can in particular have effective directions within a plane in parallel with an extension plane of a rail guide of the longitudinal adjustment assembly. Such translational components can be compensated by the supporting element 3 of the proposed solution.

In the locking position 1, which is shown, of the actuation element 2, the locking device 1 locks the seat longitudinal displacement of the vehicle seat. Accordingly, the vehicle seat cannot be adjusted in the seat longitudinal position. In contrast, the actuation element can 2, in the unlocking position, unlock the locking device 1.

The introduction of the concealing force F into the actuation portion 21 of the actuation element 2 leads to pivoting of the actuation portion 21 in the first pivot direction D1 and to pivoting of the coupling portion 22 in a second pivot direction D2 counter to the first pivot direction D1. During the pivoting, the actuation element 2 is supported, by the support portion 23 on the supporting element 3. In this case, the supporting element 3 is connected to the structural element 4, designed as a transverse pipe, via a fastening part 32. As shown, the curved fastening part 32 encompasses the structural element 4 in part. In particular, in the position shown, the supporting element 3 is fixed with respect to displacement along the longitudinal axis A. The locking device 1 locks or unlocks the vehicle seat depending on the position of the coupling portion 22 that is operatively connected to the locking device 1. Consequently, the locking device 1 can be transferred form the locking position, shown, into the unlocking position, by introduction of a force F into the actuation portion 21.

In an alternative embodiment, the supporting element 3 can also be formed in one piece with the structural element 4. Furthermore, the structural element 4 can also have a smaller extension along a longitudinal extension axis L4 of the structural element 4. In particular, the structural element 4 may not be extended over an entire width of the vehicle seat.

FIG. 1B is a perspective view of the supporting element 3 in the variant shown in FIG. 1A. According thereto, the supporting element 3 comprises the connection part 31 having the extension axis L31. Furthermore, the connection part 31 comprises the connection portion 311 which defines the receiving opening 313. The connection part 31 furthermore comprises an opening 312 on one side. Furthermore, the supporting element 3 comprises the fastening part 32 having the extension axis L32. Moreover, the fastening part 32 comprises the fastening portion 321 having the opening 322. The extension axes L31 and L32 extend perpendicularly to one another.

Figure 2B:
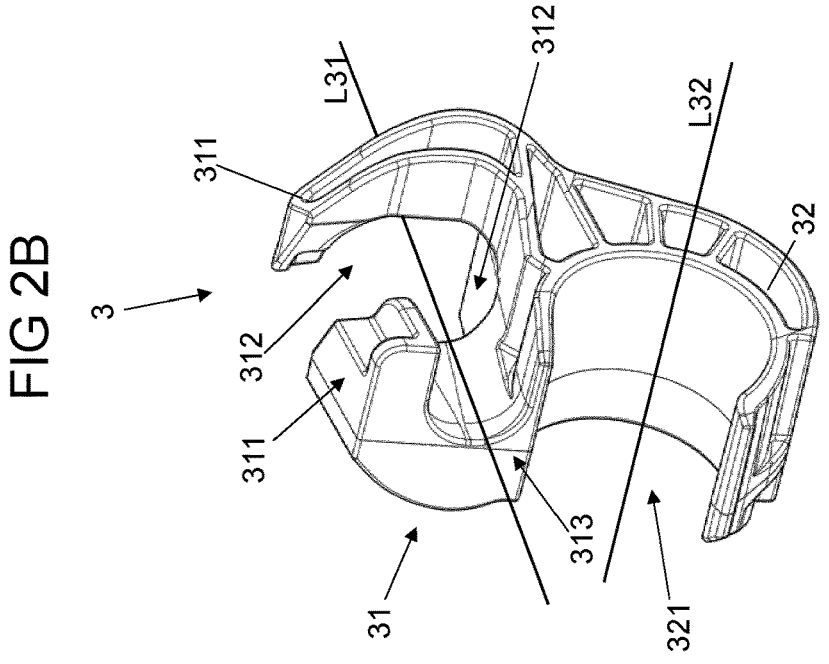
FIG. 2B is a perspective view of the supporting element in the variant shown in FIG. 2A.
Figure 2A:
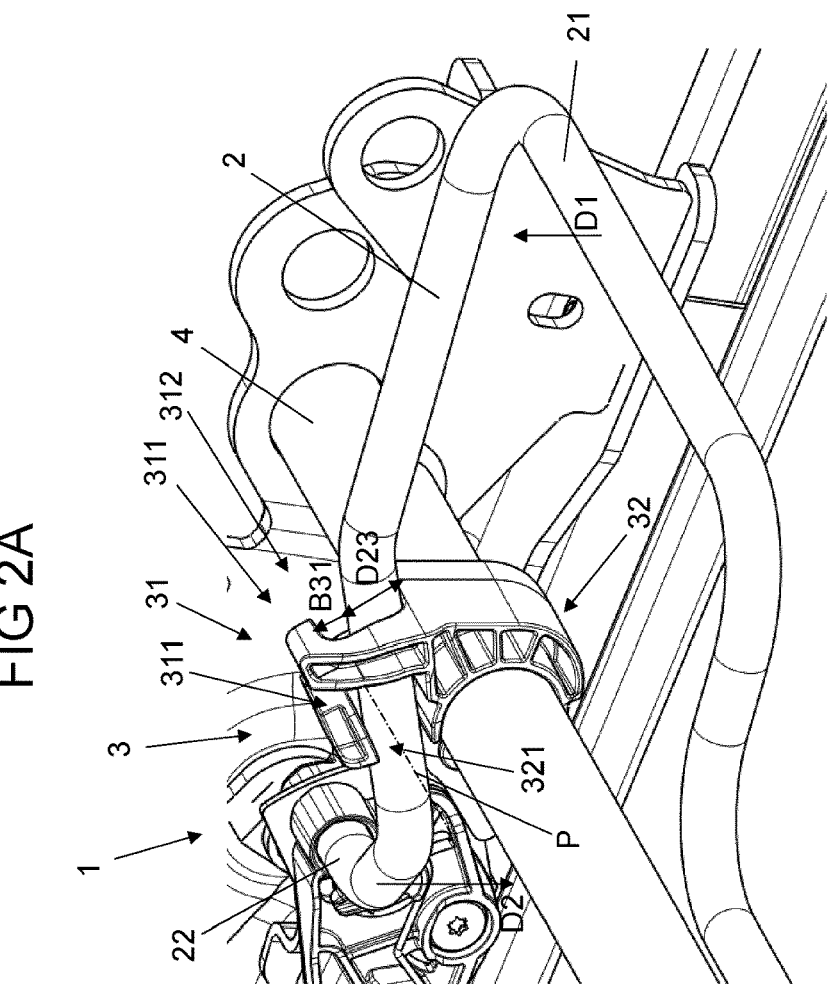
FIG. 2A is a perspective partial view of a vehicle seat of a further embodiment, comprising the supporting element in a further variant having two connection portions.

FIG. 2A is a perspective view of a part of a substructure of a further embodiment of the vehicle seat.

Analogously to the embodiment shown in FIG. 1A, the embodiment shown in FIG. 2A of the vehicle seat, comprises the supporting element 3 having the connection part 31 and the extension axis L31. However, the connection part 31 comprises two connection portions 311 that are spaced apart along an extension axis L31 of the connection part 31 and in each case encompass the support portion 23 of the actuation element 2 in part. In this case, both connection portions 311 in each case comprise an opening 312. Furthermore, the openings 312 of the two connection portions 311 are arranged on opposite sides of the supporting element 3. The two connection portions 311 encompass the support portion 23 in the orthogonal plane with respect to the extension axis L31 of the connection part 31. Furthermore, the connection part 31 defines the receiving opening 313 through which the actuation element 2 extends with the support portion 23. The receiving opening 313 is larger, by the clearance B31, than the diameter D23 of the actuation element 2 in the region of the support portion 23. The actuation element 2 is thus pivotable in the connection part 31. In particular, the actuation element 2 is also pivotable about the pivot axis P in the variant shown in FIG. 2A, which pivot axis extends through the connection part 31 of the supporting element 3. The actuation element 2 can be pivoted along an adjustment path from the locking position, which is shown, into an unlocking position by applying the adjustment force F to the actuation portion 21. In contrast, in the locking position shown, further pivoting of the actuation element 2 by applying a force counter to the adjustment force, which is shown, is not possible on account of the shaping of the connection portion 311.

The two connection portions 311 are arranged on the supporting element 3 in such a way that in each case one of the two connection portions 311 rests on the coupling portion 23 in the locking position, and the other of the two connection portions 311 rests on said coupling portion in the unlocking position. Furthermore, in the locking position the coupling portion 23 rests, as shown, on the connection portion 311 facing the locking device 1. By means of the pivoting of the actuation element 2, the coupling portion can be brought into contact with the connection portion 311 facing away from the locking device 1. In this case, the actuation element 2 can be supported on one of the connection portions 311, respectively, during the pivoting.

In alternative embodiments of the proposed solution, the connection part 31 can also have three or more connection portions 311.

In the locking position 1, which is shown, of the actuation element 2, the locking device 1 locks the seat longitudinal displacement of the vehicle seat. Accordingly, the vehicle seat cannot be adjusted in the seat longitudinal position. In contrast, the actuation element can 2, in the unlocking position, unlock the locking device 1.

The introduction of the concealing force F onto the actuation portion 21 of the actuation element 2 leads to pivoting of the actuation portion 21 in the first pivot direction D1 and to pivoting of the coupling portion 22 in a second pivot direction D2 counter to the first pivot direction D1. During the pivoting, the actuation element 2 is supported, by the support portion 23 on the supporting element 3. In this case, the supporting element 3 is connected to the structural element 4, designed as a transverse pipe, via a fastening part 32. Furthermore, the curved fastening part 32 encompasses the structural element 4 in part. In particular, in the position shown, the supporting element 3 is fixed with respect to displacement along the longitudinal axis A. The locking device 1 establishes the locking depending on the position of the coupling portion 22 of the actuation element 2 that is operatively connected to the locking device 1. Consequently, the locking device 1 can be transferred form the locking position, shown, into the unlocking position, by introduction of a force F into the actuation portion 21.

In an alternative embodiment, the connection element 3 can also be formed in one piece with the structural element 4. Alternatively, the structural element 4 can also have a smaller extension along a longitudinal extension axis L4 of the element 4. In particular, the structural element 4 may not be extended over an entire width of the vehicle seat.

FIG. 2B is a perspective view of the supporting element 3 in the variant shown in FIG. 2A. According thereto, the supporting element 3 comprises the connection part 31 having the extension axis L31. The connection part 31 comprises the two connection portions 311 that are spaced apart along an extension axis L31 of the connection part 31. In this case, both connection portions 311 in each case comprise an opening 312. In this case, the openings 312 of the two connection portions 311 are arranged on opposite sides of the supporting element 3. The connection part 31 defines the receiving opening 313. Furthermore, the supporting element 3 comprises the fastening part 32 having the opening 322 and the extension axis L32. The extension axes L31 and L32 extend perpendicularly to one another.

Figure 3:
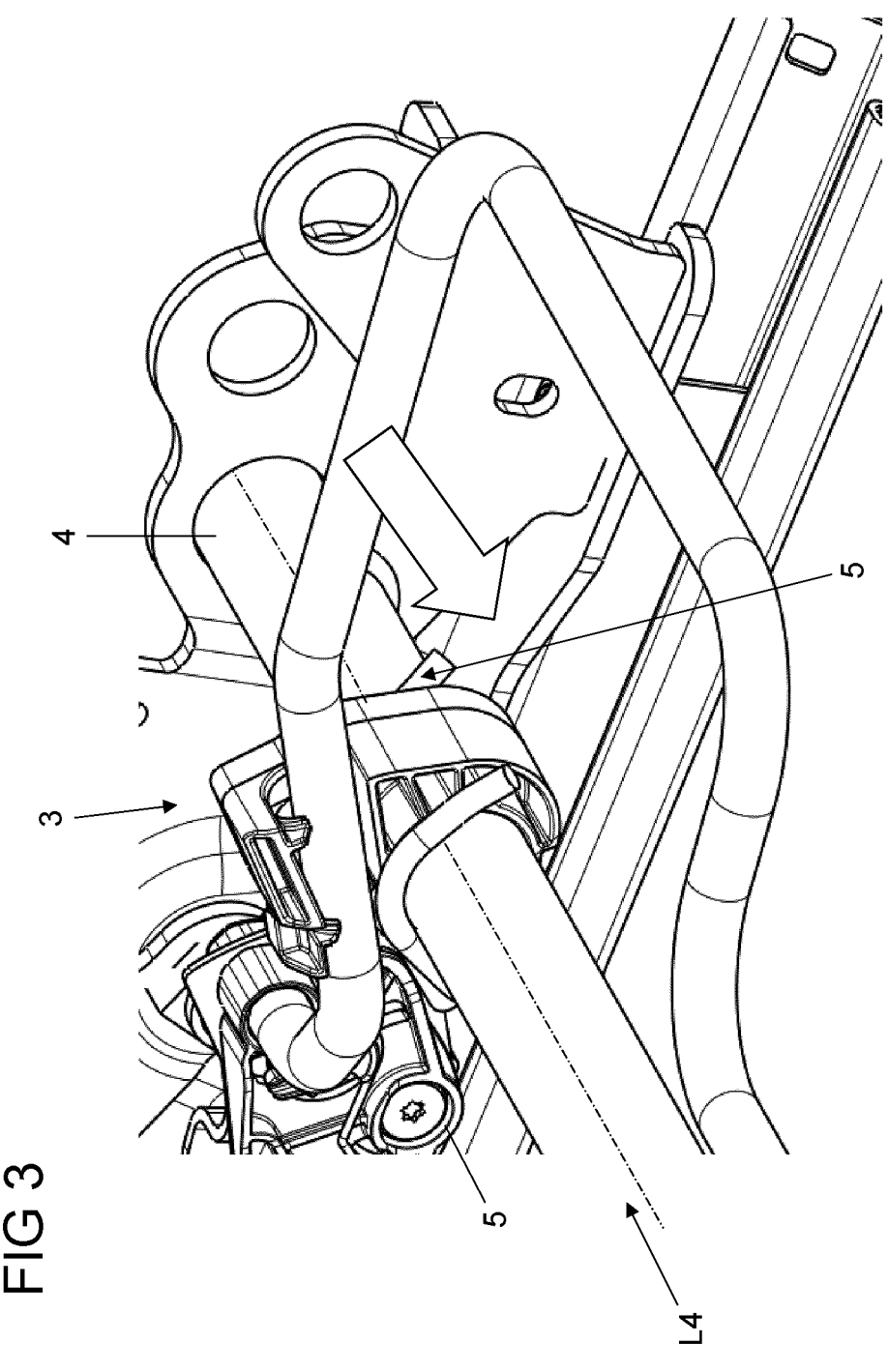
FIG. 3 is a perspective partial view of a vehicle seat of a further embodiment, comprising two securing elements.

FIG. 3 is a perspective view of a part of a further embodiment of the vehicle seat. In this case, the supporting element corresponds to the supporting element shown in FIG. 1A. In a deviation from the embodiment shown in FIG. 1A, however, two securing elements 5 are arranged on the structural element 4. In this case, the two securing elements 5 are formed having support brackets which encompass the structural element 4 in part. Said brackets are arranged on the structural element 4 on both sides of the supporting element 3, with respect to the longitudinal extension axis L4 of the structural element 4. Thus, the securing elements 5 secure the supporting element 3 axially, with respect to the longitudinal extension axis L4 of the structural element 4.

In an alternative embodiment, the securing elements 5 can be connected to the structural element 4 in a form-fitting manner. For this purpose, the structural element 4 can comprise a groove, into which the securing elements 5 engage. Furthermore, the groove can be formed transversely to the longitudinal extension axis L4 of the structural element 4. Furthermore, the groove can be designed so as to be peripheral, irrespective of the orientation of the groove. In principle, the securing elements 5 that are connected to the groove in a form-fitting manner can protrude radially out of the groove, with respect to the longitudinal extension axis L4 of the structural element 4.

In a further alternative embodiment, more or less than two securing elements 5 can also be arranged on the structural element 4. Furthermore, the securing elements 5 can also be connected to, and in particular formed in one piece with, the fastening part 4. For axially securing the supporting element, a protruding part of the securing elements 5 can define a projection.

LIST OF REFERENCE CHARACTERS

A longitudinal axis of the vehicle
1 locking device
2 actuation element
21 actuation portion
22 coupling portion
23 support portion
D23 diameter of the support portion
3 supporting element
31 connection part
B31 clearance of the connection part L31 extension axis of the connection part
311 connection portion of the connection part
312 opening of the connection part
313 receiving opening
32 fastening part
L32 extension axis of the fastening part
321 opening of the fastening part
4 structural element
L4 longitudinal extension axis
5 fixing element

The invention claimed is:

1. A vehicle seat, comprising:
a longitudinal adjustment assembly for adjusting the vehicle seat along a longitudinal axis, wherein the longitudinal adjustment assembly comprises a locking device for locking the vehicle seat in a seat longitudinal position along the longitudinal axis,
a pivotable actuation element having an actuation portion and a coupling portion, wherein an adjustment force for actuating the locking device can be introduced into the actuation element via the actuation portion and the coupling portion is provided for transmitting the adjustment force to the locking device; and
a supporting element for supporting the actuation element during a pivoting movement of the actuation element, which pivoting movement is to be carried out for the transmission of the adjustment force to the locking device,
wherein the supporting element is formed by a separate component mounted on a structural element of the vehicle seat, by means of which component the actuation element can be supported at a support portion of the actuation element during the pivoting movement for the transmission of the adjustment force, which support portion is arranged between the coupling portion and the actuation portion with respect to the longitudinal axis, and
wherein the supporting element comprises a connection part for connection to the actuation element and the connection part is resilient, at least in portions, for non-destructive releasable connection to the coupling portion.

2. The vehicle seat according to claim 1, wherein the support portion extends along an extension axis of the connection part through the connection part.

3. The vehicle seat according to claim 1, wherein the connection part comprises at least one connection portion which encompasses the support portion at least in part.

4. The vehicle seat according to claim 3, wherein the at least one connection portion comprises a lateral opening for insertion of the support portion during assembly of a module comprising the actuation element and the supporting element.

5. The vehicle seat according to claim 3, wherein the connection part comprises two connection portions that are spaced apart along an extension axis of the connection part.

6. The vehicle seat according to claim 5, wherein each of the connection portions comprises in each case one opening.

7. The vehicle seat according to claim 1, wherein the actuation element is pivotable about a pivot axis extending transversely with respect to the longitudinal axis, for actuation of the adjustment device.

8. The vehicle seat according to claim 7, wherein the pivot axis extends through the supporting element.

9. The vehicle seat according to claim 5, wherein the actuation element is pivotable about a pivot axis extending transversely with respect to the longitudinal axis, for actuation of the adjustment device, wherein the pivot axis extends between the two connection portions, with respect to the longitudinal axis.

10. The vehicle seat according to claim 1, wherein the supporting element comprises a fastening part for fastening to the structural element.

11. The vehicle seat according to claim 10, wherein the connection part defines an extension axis and the fastening part defines a further extension axis orthogonal to the extension axis, or wherein the fastening part encompasses the structural element at least in part.

12. The vehicle seat according to claim 1, wherein the structural element is arranged on the vehicle seat having a longitudinal extension axis orthogonal to the longitudinal axis.

13. The vehicle seat according to claim 1, wherein a securing element is arranged on the structural element, for securing a predetermined position of the supporting element on the structural element.

14. The vehicle seat according to claim 13, wherein the securing element is formed having a support bracket that encompasses the supporting element and the structural element at least in part and the securing element is connected to the structural element in a form-fitting manner, or wherein the structural element comprises a groove into which the securing element engages.

15. The vehicle seat according to claim 1, wherein the supporting element consists of at least one plastics material.

16. A vehicle comprising a vehicle seat according to claim 1.

17. A vehicle seat, comprising:
a longitudinal adjustment assembly for adjusting the vehicle seat along a longitudinal axis, wherein the longitudinal adjustment assembly comprises a locking device for locking the vehicle seat in a seat longitudinal position along the longitudinal axis,
a pivotable actuation element having an actuation portion and a coupling portion, wherein an adjustment force for actuating the locking device can be introduced into the actuation element via the actuation portion and the coupling portion is provided for transmitting the adjustment force to the locking device; and
a supporting element for supporting the actuation element during a pivoting movement of the actuation element, which pivoting movement is to be carried out for the transmission of the adjustment force to the locking device,
wherein the supporting element is formed by a separate component mounted on a structural element of the vehicle seat, by means of which component the actuation element can be supported at a support portion of the actuation element during the pivoting movement for the transmission of the adjustment force, which support portion is arranged between the coupling portion and the actuation portion with respect to the longitudinal axis,
wherein the supporting element comprises a connection part for connection to the actuation element,
wherein the connection part comprises two connection portions that are spaced apart along an extension axis of the connection part, and
wherein the actuation element is pivotable about a pivot axis extending transversely with respect to the longitudinal axis, for actuation of the adjustment device, wherein the pivot axis extends between the two connection portions with respect to the longitudinal axis.

18. A vehicle seat, comprising:

a longitudinal adjustment assembly for adjusting the vehicle seat along a longitudinal axis, wherein the longitudinal adjustment assembly comprises a locking device for locking the vehicle seat in a seat longitudinal position along the longitudinal axis, a pivotable actuation element having an actuation portion and a coupling portion, wherein an adjustment force for actuating the locking device can be introduced into the actuation element via the actuation portion and the coupling portion is provided for transmitting the adjustment force to the locking device; and a supporting element for supporting the actuation element during a pivoting movement of the actuation element, which pivoting movement is to be carried out for the transmission of the adjustment force to the locking device, wherein the supporting element is formed by a separate component mounted on a structural element of the vehicle seat, by means of which component the actuation element can be supported at a support portion of the actuation element during the pivoting movement for the transmission of the adjustment force, which support portion is arranged between the coupling portion and the actuation portion with respect to the longitudinal axis, wherein the supporting element comprises a fastening part for fastening to the structural element, and wherein the connection part defines an extension axis and the fastening part defines a further extension axis orthogonal to the extension axis, or wherein the fastening part encompasses the structural element at least in part.

19. A vehicle seat, comprising:

a longitudinal adjustment assembly for adjusting the vehicle seat along a longitudinal axis, wherein the longitudinal adjustment assembly comprises a locking device for locking the vehicle seat in a seat longitudinal position along the longitudinal axis, a pivotable actuation element having an actuation portion and a coupling portion, wherein an adjustment force for actuating the locking device can be introduced into the actuation element via the actuation portion and the coupling portion is provided for transmitting the adjustment force to the locking device; and a supporting element for supporting the actuation element during a pivoting movement of the actuation element, which pivoting movement is to be carried out for the transmission of the adjustment force to the locking device, wherein the supporting element is formed by a separate component mounted on a structural element of the vehicle seat, by means of which component the actuation element can be supported at a support portion of the actuation element during the pivoting movement for the transmission of the adjustment force, which support portion is arranged between the coupling portion and the actuation portion with respect to the longitudinal axis, wherein a securing element is arranged on the structural element, for securing a predetermined position of the supporting element on the structural element, and wherein the securing element is formed having a support bracket that encompasses the supporting element and the structural element at least in part and the securing element is connected to the structural element in a form-fitting manner, or wherein the structural element comprises a groove into which the securing element engages.

\*    \*    \*    \*    \*